US007617122B2

(12) United States Patent
Kumar et al.

(10) Patent No.: US 7,617,122 B2
(45) Date of Patent: Nov. 10, 2009

(54) TARGETED ONLINE MARKETING

(75) Inventors: Manoj Kumar, New Delhi (IN); Parul A Mittal, New Delhi (IN); Natwar Modani, New Delhi (IN); Amit Anil Nanavati, New Delhi (IN); Biplav Srivastava, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1570 days.

(21) Appl. No.: 10/230,910

(22) Filed: Aug. 28, 2002

(65) Prior Publication Data

US 2004/0044565 A1 Mar. 4, 2004

(51) Int. Cl.
*G06Q 30/00* (2006.01)
(52) U.S. Cl. .............................. 705/14; 705/10; 705/26; 705/27
(58) Field of Classification Search ................... 705/10, 705/14, 26
See application file for complete search history.

(56) References Cited

U.S. PATENT DOCUMENTS 5,886,683 A * 3/1999 Tognazzini et al. .......... 715/700
5,991,735 A * 11/1999 Gerace ........................ 705/10
6,477,575 B1 * 11/2002 Koeppel et al. ............. 709/224

OTHER PUBLICATIONS

M. Charikar, R. Kumar, P. Raghavan, S. Rajagopalan and A. Tomkins, "On Targeting Markov Models", Proc. STOC 1999, Atlanta,Georgia, USA.

D.M. Chickering and D. Heckerman, "Targeted advertising with inventory management", pp. 145-149, Proceedings of the 2nd ACM Conference on Electronic Commerce, Oct. 17-20, 2000, Minneapolis, MN USA.
Rangachari Anand, Manoj Kumar and Anant Jhingran, in "Distributing E-Coupons on the Internet", Proceedings of INET, Jun. 1999.
R. D. Lawrence, G. S. Almasi, V. Kotlyar, M. S. Viveros, S. S. Duri, "Personalization of Supermarket Product Recommendations", RC 21792, IBM Research Report.
Jose Borges and Mark Levene ,"Data Mining of User Navigation patterns" ,WEBKDD 1999, pp. 92-111.
Igor Cadez and David Heckerman and Christopher Meek and Padhraic Smyth and Steven White,"Visualization of navigation patterns on a web site using model based clustering", KDD 2000, pp. 280-284.
Badrul Sarwar, George Karypis, Joseph Konstan, and John Riedl, "Analysis of Recommendation Algorithms for E-Commerce", EC 2000, pp. 158-167.
Mukund Deshpande and George Karypis ,"Selective Markov Models for Predicting Web Page Accesses", University of Minnesota, Technical report #00-056.

* cited by examiner

*Primary Examiner*—Raquel Alvarez
(74) *Attorney, Agent, or Firm*—Gibb I.P. Law Firm, LLC

(57) ABSTRACT

Selecting one or more marketing messages for optimal display at marketing locations in a marketing environment is performed on the basis of information relating to a user to whom the messages are to be displayed, the marketing messages, and the marketing locations. Dynamic selection and display of marketing messages in this manner can be advantageously performed for online environments for which relevant information is readily accessed and used as a basis for selection and display of marketing messages.

17 Claims, 13 Drawing Sheets

TARGETED ONLINE MARKETING

FIELD OF THE INVENTION

The present invention relates to marketing techniques and relates particularly to improved targeted marketing techniques that target users navigating online environments.

BACKGROUND

Internet advertising generates revenue at a large number of online sites. Brokers intermediate between advertisers and online sites to facilitate the display the advertisements to a targeted audience. One example of such a broker is Double-Click, Inc.

Existing web advertisement selection engines use a number of partially successful techniques to target customers. Typically, the effectiveness of these techniques is measured in terms of audience response rates. Audience response, also referred to as "click through", is evaluated by counting the number or frequency of users that click on a "banner advertisement" contained on a web page presented to the user.

Clicking on a banner advertisement at a web site typically takes the user to the web site of the advertiser, where additional information about the advertised product or service is provided.

Chickering et al, in D M Chickering and D. Heckerman, "Targeted advertising with inventory management", pages 145-149, Proceedings of the 2nd ACM Conference on Electronic Commerce, Oct. 17 to 20, 2000, Minneapolis, United States, describe a technique to determine a targeted advertising schedule. The targeted advertising schedule is based on known attributes of each visitor, and attempts to improve audience response given advertisement inventory management constraints. The schedule comprises the number of times an advertisement is to be shown to a particular group of users during a specified time period.

Existing web advertising techniques that target advertisements to users emphasise the user or user profile characteristics. These existing techniques ignore the characteristics of the web marketing space (WMS), as well as the characteristics of the advertisements.

Further, existing techniques do not take into account a series of WMS or a series of advertisements simultaneously. Also, they do not maximise across different marketing types, but only for advertisements. Neither do they optimise across different users or user segments. Consequently, they do not make the optimal use of the available WMS.

Showing a combination or series of marketing messages to a user can sometimes better achieve an advertiser's objective. For example, to promote a wristwatch, a series of three advertisements may be shown: (i) an advertisement of the watch itself; (ii) another advertisement of the watch involving a celebrity; and finally (iii) a coupon for purchasing the watch. Such series of promotional messages can enhance the chances of the user accepting the coupon, and entice the user to buy the watch.

Systems have also been proposed to determine the most suitable product to recommend to a given user. Lawrence et al, in R D Lawrence, G S Almasi, V Kotlyar, M S Viveros, S S Duri, "Personalization of Supermarket Product Recommendations", RC 21792, IBM Research Report, characterise customers and products on the same attribute space and then compute product recommendations for individual customers.

Existing techniques used by recommender systems involve: content-based filtering, collaborative filtering and association rules. Content-based filtering systems recommend items based on their similarity to what a particular person has liked in the past. Typically, both items and profiles are represented as vectors in a space of features and a similarity is computed between them. Collaborative filtering recommends items that other people, similar to the person in question to whom the items are recommended, have liked. Collaborative filtering uses clustering of customer ratings and explicit or implicit preferences.

Techniques based on association rules compute frequent item sets from the past transaction data. Association rules involve rules of the type: a implies b, to recommend b to the customer who buys a.

Existing product advertising techniques involve user and/or product/content characteristics to target the recommendation to the user, without taking into account the manner in which the advertisement is shown.

Related to existing advertising and product recommendation systems, are proposed systems for electronic coupons. Anand et al, in Rangachari Anand, Manoj Kumar and Anant Jhingran, in "Distributing E-Coupons on the Internet", Proceedings of INET, June 1999, describe an e-coupon delivery system that offers e-coupons to shoppers at the appropriate stage of the shopper's visit to an online storefront on the Internet.

Anand et al discuss how shopper activity in an electronic storefront can be monitored to infer resistance to or propensity for buying various merchandise. This information can be used to decide: which e-coupons to offer, the terms of the e-coupon, and when the e-coupons should be offered. This technique takes the user characteristics, web page attributes and different marketing objectives when selecting which e-coupon to show on a web page into account.

U.S. Pat. No. 6,134,532, issued Oct. 17, 2000 to Lazarus et al, describes a system and method for selecting and presenting to users personally targeted entities such as advertising, coupons, products and information content. Selection and presentation is based on tracking observed behavior on a user-by-user basis, and using an adaptive vector space representation for both information and behavior information.

The system described in Lazarus et al matches users to entities in a manner that improves with increased operation and observation of user behavior. User behavior, entities (that is, advertisements, coupons, products etc) and information are all represented as content vectors in a unified vector space. Though the system attempts to optimise across different marketing message types, the system only takes into account the attributes of the marketing message and the user, rather than the environment in which the messages are delivered. For a given environment, the system selects a preferred message to show to the user. The system updates the user and attributes as the session progresses.

In view of the above, a need clearly exists for improved marketing techniques that at least attempt to address one or more limitations of prior art approaches.

SUMMARY

A method, system and computer software is herein described for advantageous use of "web marketing space", by determining an approximately optimal "marketing element" (ME) to be shown, on a plurality of web marketing spots (WMS), to a plurality of users. Selections are described herein for convenience as "optimal", though optimality is in this context approximate. The described techniques find particular application to the selection of advertisements and similar promotional messages to advertising sites on Web pages.

The notion of optimality, as described herein, is dependent on the merchant's marketing objective and can be with respect to: (i) the profit from product purchase or (ii) gain in market share, (iii) increase in product awareness by showing a marketing element to a particular user, (iv) time taken to compute the solution, or some other criterion. Optimality, as described herein, is approximate rather than absolute.

The terms marketing element and web marketing spot respectively relate to a marketing message presented to a user, and a marketing environment in which that message is presented. Typically, the web marketing spot is a predetermined part of a web page, and the marketing message is presented in the form of a banner advertisement in that portion of the web page.

An approximately optimal match of an ME to a WMS can be determined not only for an individual WMS at a time but also for a series of WMSs simultaneously. The decision to combine a number of WMS together as a series can be more favourable than for handling each WMS individually as some coupons give more value when offered together. Optimization across users is supported for budgeted cases; for example, in cases for which there is a limited number of coupons to offer, or advertisements to show. The merchant can optimize across users, where he or she may receive a lesser reward from one user but makes up for this loss with extra rewards from another user.

Dynamic assignment of the ME type to be shown in a WMS is supported. That is, the assignment need not be done at the time of the site design. The described techniques support optimisation across different ME types for a given WMS, and allow the assignment, of an ME to a WMS, to be personalised or targeted for an individual user or user profile.

The decision process by which a ME is assigned to a WMS changes as the user navigates the site, incorporating the user's current session activities in the decision. The merchant can specify which WMS should be pre-assigned to an ME, or an ME type, and which WMS are dynamically determined.

The dynamic introduction of a new WMS of a specific type is supported during a user session. That is, the merchant has earlier planned not to show any ME on a page, but if the introduction of a new WMS is favoured, based in the user session, the merchant can introduce a WMS to an ME to the user.

DETAILED DESCRIPTION

A method, a computer system, and computer software for targeted online marketing are described herein in the context of placing marketing messages in a marketing environment. In particular, techniques are described herein in relation to placing advertisements on Web pages that are served to users via the Internet.

Figure 1:
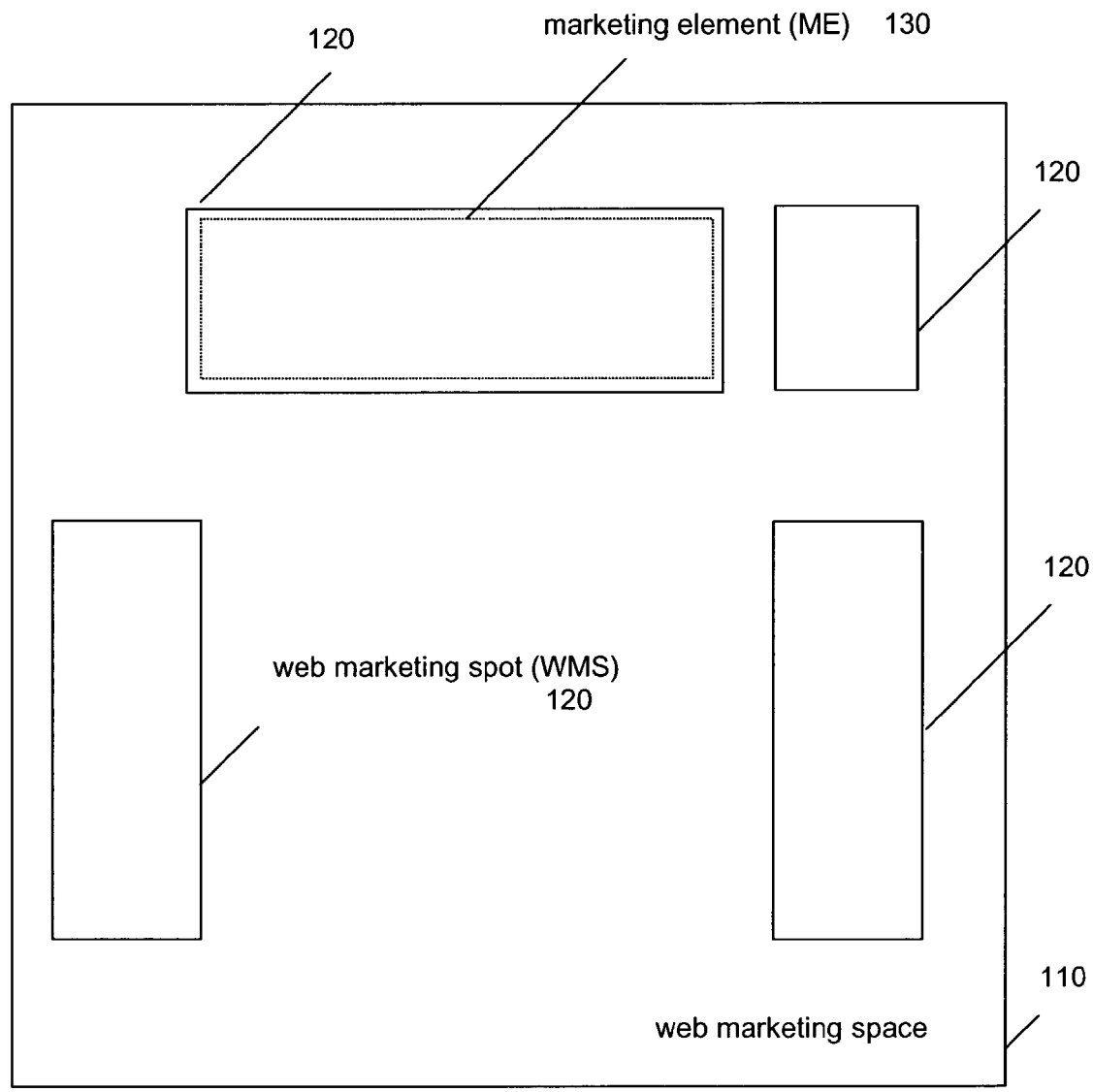
FIG. 1 is a schematic representation of a marketing environment, and marketing messages that can be presented in marketing locations in the marketing environment.

FIG. 1 schematically represents a marketing environment or web marketing space 110 in which there are located predetermined marketing locations, referred to herein as web marketing spots (WMSs) 120. Marketing messages or advertisements are placed within the WMSs 120, and are referred to herein as marketing elements (MEs) 130. In FIG. 1, the web marketing space 110 is a page-oriented environment such as a Web page. WMSs 120 are located peripherally of a main central portion of the web marketing space 110 surrounding, for example, content that the user wishes to view in the web marketing space 110.

Advantageous use of a web marketing space involves determining a plurality of optimal marketing elements (ME) to be shown, to users on a plurality of web-marketing spots (WMS), for a plurality of merchant objectives. The optimality of ME allocation is dependent on the merchant's marketing objective and can be, for example, with respect to: (i) the profit from product purchase; or (ii) gain in market share; or (iii) increase in product awareness by showing a marketing element to a particular user, or (iv) time taken to compute the solution.

Terminology

A marketing environment is any real or virtual space in which marketing messages, such as advertisements, can be provided. Marketing locations are "sites" at which marketing messages can be provided within the marketing environment. In this case, the marketing environment, referred to as the Web marketing space, is the Web, or a selected web site or page. The marketing locations, or web marketing spots (WMSs) are "sites" at which the marketing messges, or marketing elements (MEs), can be provided. Typically, marketing elements (MEs) such as banner advertisements are provided at nominated locations on a web page.

1. A user is any visitor to a marketing environment, such as an online site, and can be characterized by attributes such as past transactions, current session information or demographic data. These attributes constitute a user feature vector.
   (i) Past transaction attributes comprise: products or product categories purchased, response to advertisements, cross-sales and up-sales, coupon acceptance and redemption record, response to discounts, navigation paths, or other WMSs visited.

(ii) Current session attributes comprise: shopping cart contents, WMS visited in session, products or product categories viewed, or response to any MEs shown in the session.

(iii) Demographic attributes comprise: income group, age, gender, marital status, geographical location, explicitly mentioned interests, or other similar features.

2. A web marketing spot (herein referred to as a WMS) is a location on a web page that has been designated by the site designer for showing marketing elements such as advertisements, product recommendations, discounts and electronic coupons. A web marketing spot can be characterized by attributes such as: the content of the containing page, the type of the containing page, probability of a user to visit the containing page, and the location of the spot on the containing page. Content can be in terms of products or product categories, and the type can be: "catalogue" page, "login" page, "shopping cart" page, "order process" page etc. These attributes constitute the WMS feature vector.

3. A marketing element (ME) is the message that is displayed at a WMS to achieve one or more marketing objectives. Some examples of commonly used marketing elements are advertisements, discounts, cross-sell recommendations, up-sell recommendations, coupons, etc. A ME can be characterized by advertised, recommended or discounted products or product categories. Additionally, a coupon can be characterized by validity period, discount type and amount, redemption terms, etc. These attributes constitute the ME feature vector.

Example Arrangements

The inputs and outputs of different implementations are as shown in Table 1 directly below.

TABLE 1

| | | INPUT | | | |
|---|---|---|---|---|---|
| S. No. | WMS | User | ME | Merchant Objective | OUTPUT |
| Case 1 | Single | Single | Multiple | Single | WMS-ME Match |
| Case 2 | Multiple | Single | Multiple | Single | WMS-ME Matches |
| Case 3 | Multiple | Single | Single | Single | WMS-ME Match |
| Case 4 | S/M | Multiple | S/M | Single | WMS-ME Match(es) |
| Case 5 | S/M | S/M | S/M | Multiple | WMS-ME Match(es) |

Each of the examples in Table 1 are described below under the headings below that refer to correspondingly numbered "cases". Each case represents an example of different inputs and outputs as tabulated in Table 1 and described below in relation to cases 1 to 5.

Case 1

A first example involves selecting, from a given set of marketing elements, an optimal marketing element ME to display at a given WMS, for a given user in a user session.

Figure 2:
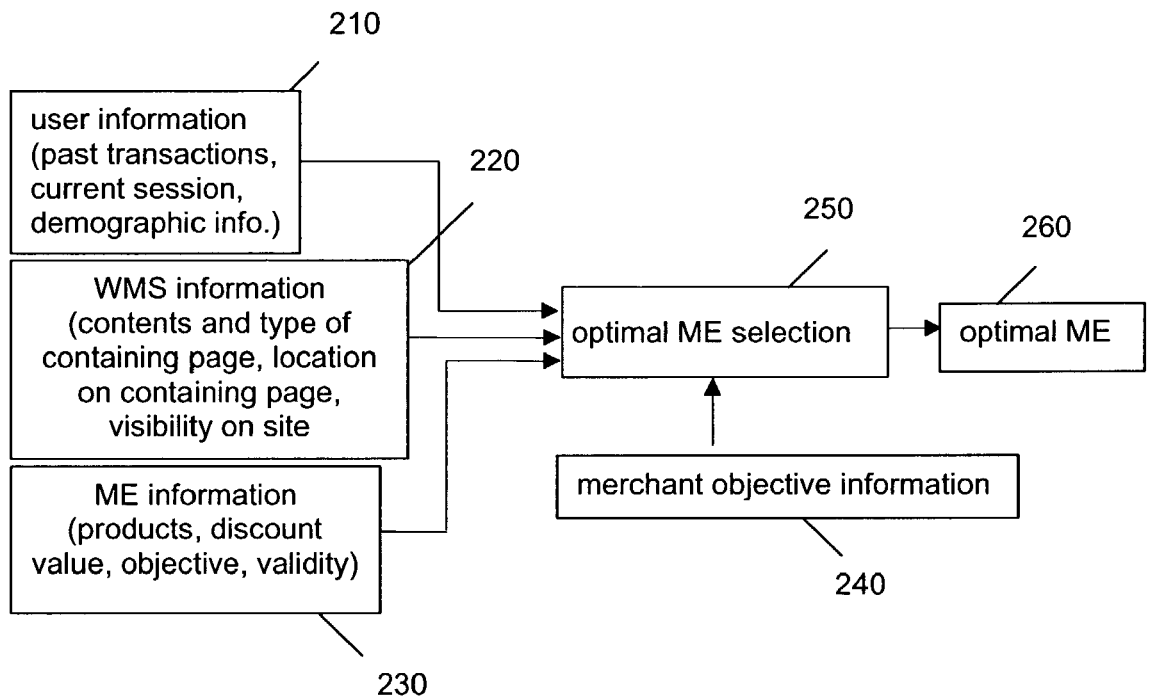
FIG. 2 is a schematic representation of optimal ME selection for an input merchant objective, user, WMS information and ME information.

FIG. 2 schematically represents this example. User information 210, WMS information 220, ME information 230 and merchant objective information 240 is provided as input to an optimal ME selection process 250.

The process 250 selects optimal marketing element(s) and outputs one optimal ME 260 to be displayed on the WMS to the user. This occurs when the appropriate page is visited.

Figure 3:
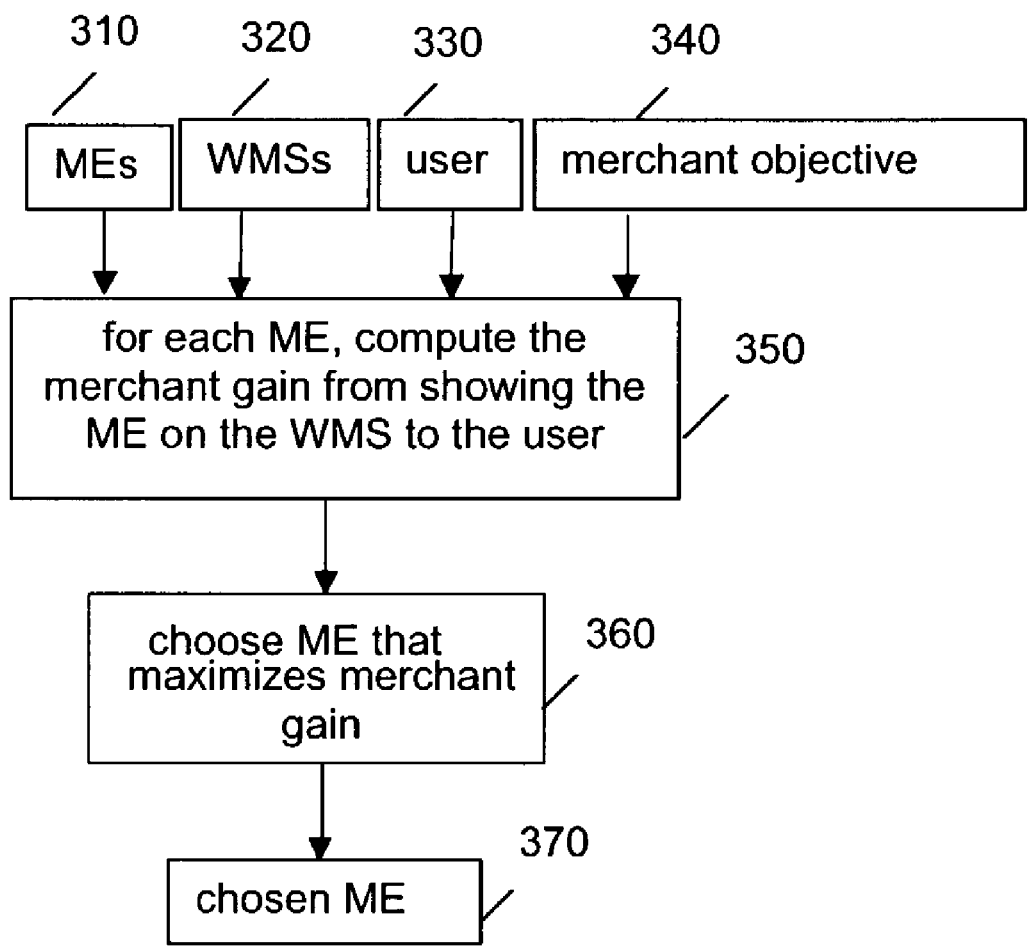
FIG. 3 is a schematic representation of optimal ME selection for the same inputs represented in FIG. 1, in which selection is made with reference to "merchant gain".

FIG. 3 is a flowchart representing one optimal marketing element selection technique. The MEs 310, WMSs 320, user 330 and merchant's objection 340 are supplied as input. Each of these inputs is used in step 350 to compute the merchant gain from showing the ME to the user. In step 360, the ME that maximizes the merchant gain is selected. The output of this computation is consequently the chosen ME 370.

For each ME in the input set, the merchant gain from showing the ME on the WMS to the user is computed. The computation of merchant's gain can be dependent on the ME type.

One formulation for the merchant gain from different ME types is shown directly below in Table 2.

TABLE 2

$$\text{Gain(Coupon ME)} = \text{Probability(User accepts the offered coupon)} \times$$
$$\text{Probability(Coupon redemption)} \times$$
$$\text{Profit from product purchase using coupon}$$

$$\text{Gain(Cross-sell ME)} = \text{Probability(User purchases product)} \times$$
$$\text{Profit from product purchase}$$

$$\text{Gain(Advertisment ME)} = \text{Probability(User clicks on advertisement)} \times$$
$$\text{Profit from advertisement click-through}$$

The various probabilities, in Table 2, can be computed from the input features of: the user 330, WMS 320 and ME 310. For example, the probability of the user accepting the coupon depends on the user's responsiveness to the coupon ME type, the match between the ME and WMS characteristics, the match between the user and ME, and the match between the user and WMS.

The merchant's objective can change the value of the gain from various MEs. For example, if the merchant's objective is to clear inventory, gain from a coupon or a cross-sale may be higher than from an advertisement.

The technique described with reference to FIG. 2 can take into account both the user and the merchant's marketing objective in determining the optimal ME to display to the user.

The web page that the user accesses can contain a plurality of WMSs, in which case the system can compute the optimal ME for all or a predetermined subset of the WMSs on the page. The computation involved is essentially the same as in the second example, which is described below in relation to FIG. 4.

The WMSs can be specified for which the personalized, optimal ME is dynamically computed. Predetermined MEs can be assigned to respective WMSs, and permit dynamic computation of other WMSs. The selection of dynamically computed WMSs can be made for a specific user, a specific user segment or for all users. The system then runs the optimal ME selection, for the selected WMSs, in accordance with the process described above with reference to FIG. 2.

As the user navigates the marketing environment, a record of ME selection for each WMS can be maintained in a historical profile of records or decisions for each user session. This historical profile, derived from the current user session, is used for subsequent decisions in the current user session. This history profile can be incorporated in optimal selection of MEs through the merchant gain expressions in Table 2. The probabilities and the profit in these expressions can be updated to reflect the content of the historical profile.

The historical profile records the following information:
- the MEs actually shown to the user previously in the current user session
- the user's responses to the shown MEs, for example, clickstream data As an example, if the user has accepted a coupon earlier in the session, offering the coupon again may not be as valuable or likely. This information can be reflected in the probability of coupon redemption decreasing for multiple coupons on the same product. The probability of a user accepting an offered coupon decreases if he or she has rejected a coupon relating to similar product earlier in the session. The probability of a user clicking on an advertisement shown at a WMS increases the probability of the user clicking on similar advertisements and advertisements shown at similar WMSs.

Case 2

A second example involves selecting an optimal subset of marketing elements (from a given set of marketing elements) to display in a set of WMSs for a given user in a user session.

Figure 4:
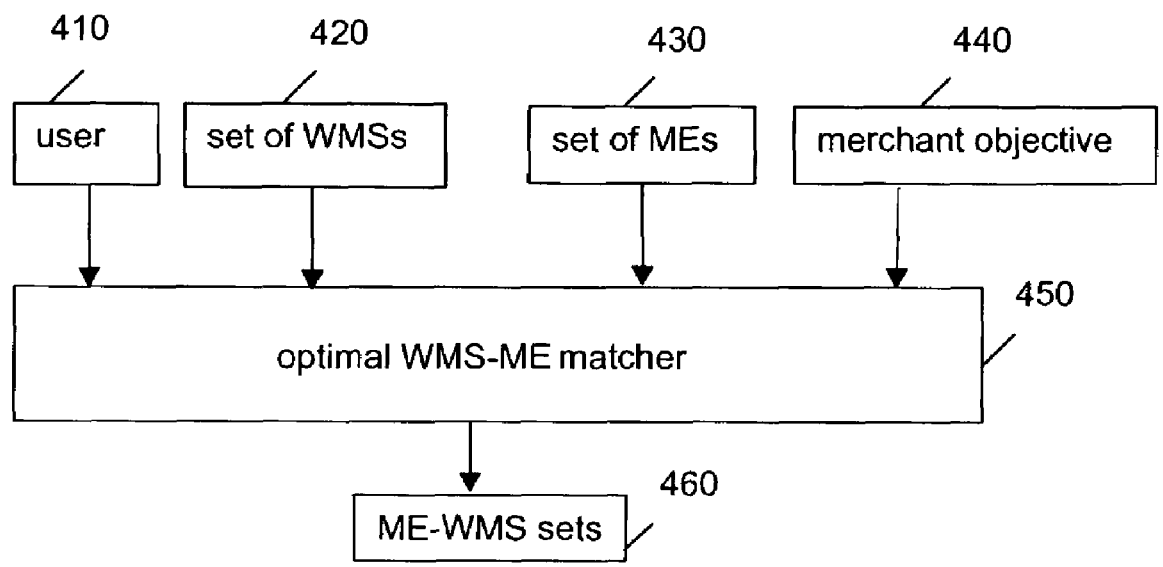
FIG. 4 is a schematic representation of inputs and outputs involved in optimally matching WMSs and MEs.

FIG. 4 schematically represents optimally matching WMSs and MEs. With reference to FIG. 4, the "optimal WMS-ME matcher" 450 takes as input: a user 410, a set of WMSs 420, a set of MEs 430, and a merchant objection 440. The marketing elements 430 are optimally matched to the WMSs 420, and the output is provided as sets of associated MEs and WMSs 460.

The optimality of the matching is dependent on: the merchant's objective, and the particular user. The optimality can be with respect to: the profit from product purchase or gain in market share, or increase in product awareness by showing a marketing element.

This example recognises that displaying a combination of MEs to a user can better achieve the merchant objective. For example, to promote a wrist watch, first a advertisement of the watch may be shown, another advertisement of the watch may be shown later with a celebrity advertising the wrist watch, and then the coupon on the wrist watch itself may be offered. This series of MEs can enhance the likelihood that the user accepts the coupon and use the coupon to buy the wrist watch.

Figure 5:
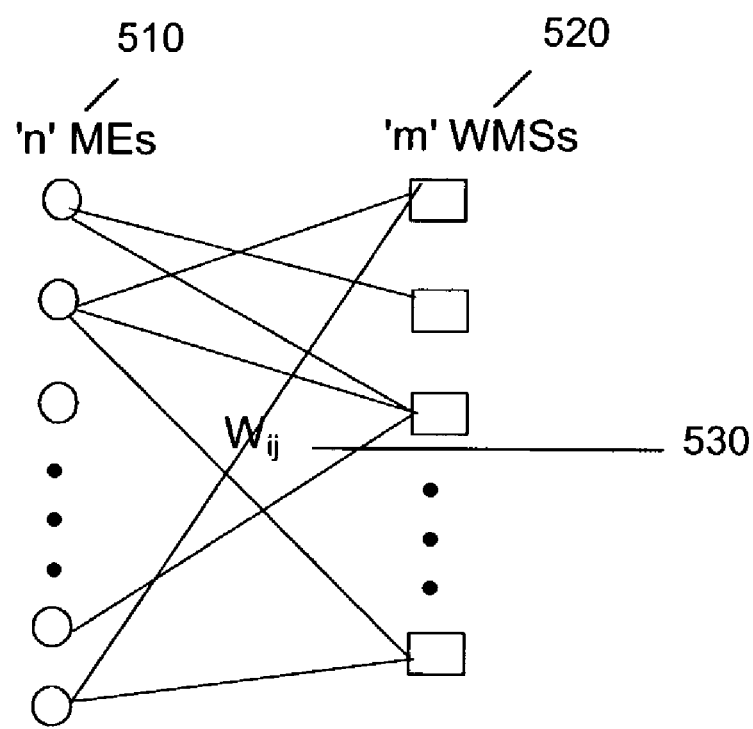
FIG. 5 is a schematic representation of optimal WMS-ME matching involving a maximum weighted matching using a bipartite graph.

FIG. 5 is a bipartite graph that represents the process performed by the optimal WMS-ME matcher of FIG. 4. As shown in FIG. 5, the WMS-ME matching task can be formulated and solved as the maximum weighted matching problem in a bipartite graph.

A bipartite graph is a graph in which the vertex set is partitioned into two classes and every edge in the graph has an end in each class. FIG. 5 is a bipartite graph in which one class represents MEs and the other class represents the WMSs.

The MEs 510 and WMSs 520 constitute vertices of the bipartite graph, the edges of the bipartite graph connect MEs 510 and WMSs 520. An edge between an ME 510 and a WMS 520 indicates that the ME 510 is being shown at the WMS 520. The merchant gain from displaying an ME 510 at a WMS 520 can be represented by a weight $W_{ij}$ 530 on the edge of the bipartite graph connecting $ME_i$ 510 and $WMS_j$ 520.

One formulation for the merchant gain that can be used is that provided above in Table 2. The maximum weighted matching solution gives a subset of edges, such that no two edges in the solution subset share a vertex and the sum of the weights 530 on selected edges is maximized. The solution allows one ME 510 to be shown only at one WMS 520.

The optimal matching approach provided by the bipartite graph of FIG. 5 can be extended to allow an ME to be shown at multiple WMSs. With reference to FIG. 5, to allow an ME to be shown at multiple WMSs, create an additional ME vertex for each WMS, draw an edge between the new ME vertex and the WMS vertex, and solve the maximum weighted matching on the revised bipartite graph.

When the user browses a marketing environment, the optimal WMS-ME matcher determines the ME to be shown on each of the possible WMS that the user can access in his/her session. The system then shows the appropriate ME to the user on each WMS that the user accesses.

This matching approach can give an improved result to the merchant compared with computing the optimal ME for each WMS individually, as done in FIG. 2. The determination of the possible pages that the user might access is performed by analysing past accesses by the user and/or collaborative filtering on past user access records. Refer to Badrul Sarwar, George Karypis, Joseph Konstan, and John Riedl, "Analysis of Recommendation Algorithms for E-Commerce", EC 2000, pp. 158-167 for a relevant discussion. The content of this reference is hereby incorporated by reference.

A description of relevant techniques that can be used to perform these steps is available in:
(i) Jose Borges and Mark Levene, "Data Mining of User Navigation patterns", WEBKDD 1999, pp. 92-111.
(ii) Igor Cadez and David Heckerman and Christopher Meek and Padhraic Smyth and Steven White, "Visualization of navigation patterns on a web site using model based clustering", KDD 2000, pp. 280-284.

The content of both these references is hereby incorporated by reference.

The determination of the ME-WMS sets can be performed prior to a user's visit to a marketing environment, based on the available user information.

The optimal WMS-ME match can be determined for a given user, a set of MEs and the merchant objective, where the user's likely navigation through the WMSs is known in a probabilistic manner.

Figure 6:
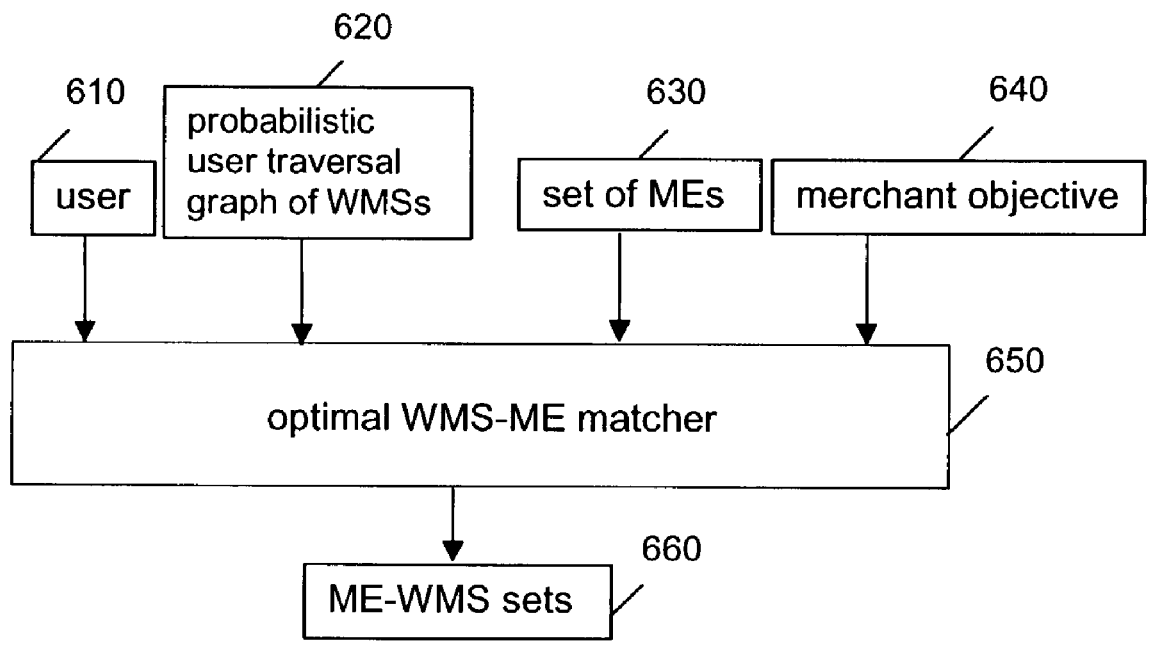
FIG. 6 is an alternative implementation of the arrangement of FIG. 4.

FIG. 6 schematically represents an arrangement that takes into account this probabilistic navigation information. The optimal matcher 650 takes as input information relating to: a user 610, probabilistic use traversal graph of WMSs 620, a set of MEs 630, and the merchant's objection 640.

As shown in FIG. 6, one possible solution for efficient matching is to maximize the sum of (Probability that user visits WMS 'j')*(Reward from ME 'i')*($S_{ij}$) over all 'i' and 'j'. Here 'i' ranges from 1 to n for the number of MEs, 'j' ranges from 1 to m for the number of WMSs and $S_{ij}$ are the variables of an expression representing the probability of showing the ME 'i' on the WMS 'j' Table 3 presents this expression.

The expression can be solved for variables $S_{ij}$, using the linear programming technique, subject to constraints such as a maximum of one ME can be shown at any WMS, too many exposures of an ME is not desirable, $S_{ij}$'s are between 0 and 1 etc. The solution may come up with $S_{ij}$'s as real values or 0 or 1. If the values are 0 or 1, then the solution is deterministic, else the solution is probabilistic.

TABLE 3

Solve max $\sum_{ij} V_j S_{ij} P_{ij} R_j$ where $\forall j \sum_{i=1}^{i=N} S_{ij} \leq 1$ and $\forall (i, j) S_{ij} \geq 0$ $V_j$ = Probability of being in Site j
$S_{ij}$ = Probability of showing Coupon i on Site j
$P_{ij}$ = Probability of acceptance of Coupon i on Site j
$R_i$ = Reward for Coupon Alternatively, one may only want to maximize the acceptance of marketing elements in which case, the linear programming problem is as presented in Table 3.

TABLE 4

$$\text{Solve max} \sum_{ij} V_j S_{ij} P_{ij} R_j$$

$$\text{where } \forall\, j \sum_{i=1}^{i=N} S_{ij} \leq 1$$

$$\text{and } \forall\, (i,j) S_{ij} \geq 0$$

$V_j$ = Probability of being in Site j
$S_{ij}$ = Probability of showing Coupon i on Site j
$P_{ij}$ = Probability of acceptance of Coupon i on Site j These linear programs (LPs) can be solved by any standard LP packages. If needed, one can also solve the matching problem as a multi-objective LP.

Figure 7:
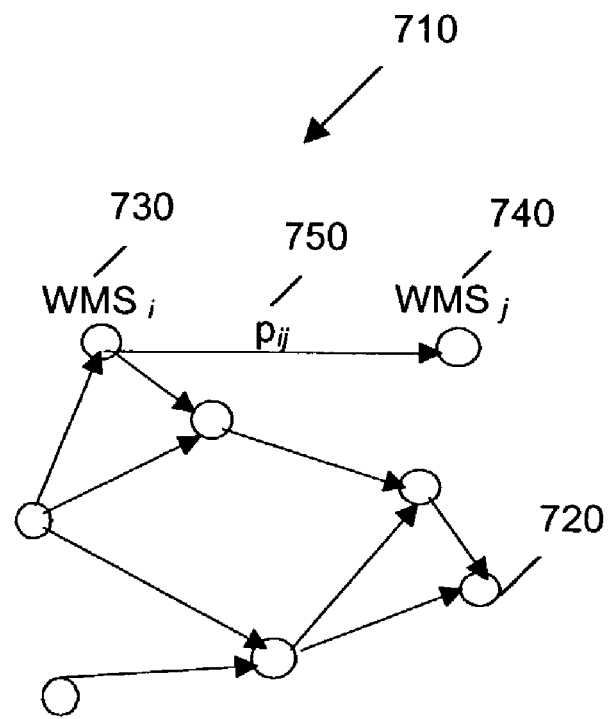
FIG. 7 is a schematic representation of optimal WMS-ME matching involving linear programming.
Figure 8:
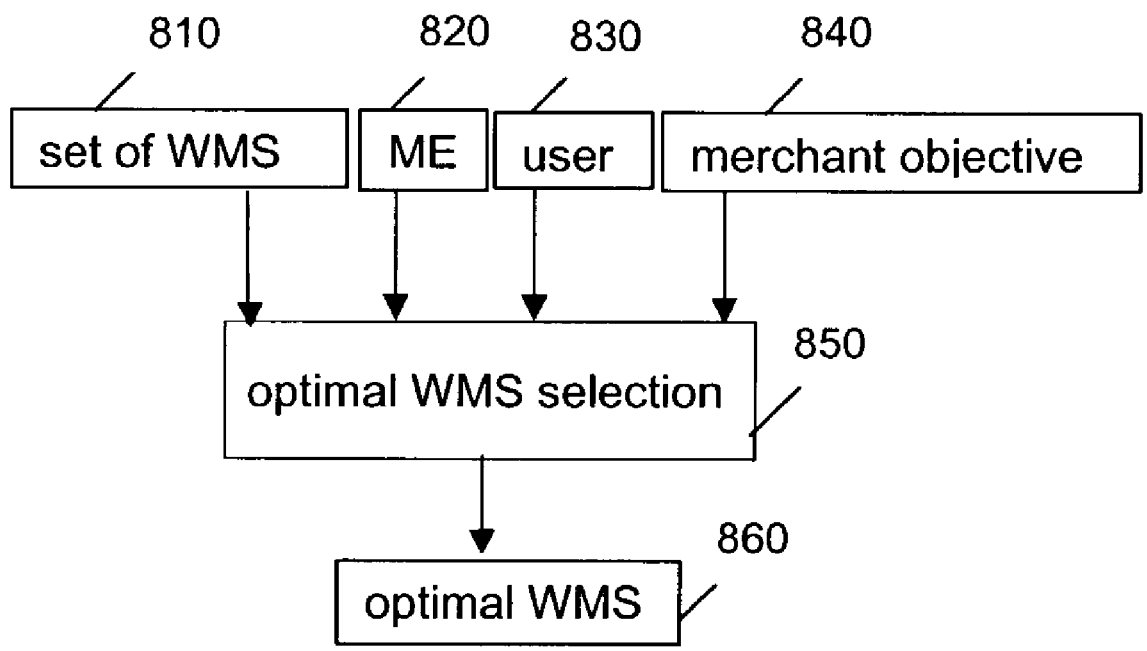
FIG. 8 is a schematic representation of inputs and outputs involved in optimally selecting a WMS for a given ME.

FIG. 7 schematically represents the probabilistic traversal graph through WMSs. This graph can be a directed graph whose nodes are the WMSs, as depicted in FIG. 7. Edges between two WMSs depict a navigational path from one WMS to the other. Each edge has an associated transition probability.

The system does an optimal matching of the marketing elements to the WMS graph and outputs a marketing element for each WMS to be shown to the shopper. The optimal output may be probabilistic in nature. That is, the output may give probabilities of showing an ME on a WMS.

With reference to FIG. 7, one possible linear programming solution for efficient matching involves maximizing the sum of:

(Probability that user visits WMS j)×(Reward from ME i)×($S_{ij}$) over all i and j.

In this case, i ranges from 1 to n for the number of MEs, and j ranges from 1 to m for the number of WMSs and $S_{ij}$ are the variables of the expression representing the probability of showing the ME i on the WMS j. The expression can be solved for variables $S_{ij}$, using linear programming techniques, subject to constraints such as a maximum of one ME can be shown at any WMS, too many exposures of an ME is not desirable, $S_{ij}$s are between 0 and 1 etc. The solution may come up with $S_{ij}$s that are real values, or binary values 0 or 1. If the values are binary 0 or 1, then the solution is determiinistic, otherwise the solution is probabilistic.

When the user enters a marketing environment, the user's navigational path is not known a priori. The system uses the techniques described with reference to FIG. 5, with probabilistic values for the user's visit to any WMS during the session. In this case, the system may show a ME in a WMS with a probability. One possible method for modelling a user's navigation through an online site using a Markov chain is described by Deshpande et al, in Mukund Deshpande and George Karypis, "Selective Markov Models for Predicting Web Page Accesses", University of Minnesota, Technical report #00-056. The contents of this reference are hereby incorporated by reference.

The optimal ME-WMS matcher in FIG. 4 and FIG. 6 can be dynamic in nature. That is, the optimal match computed before the user session starts is dynamically updated as the user's current session attributes get updated. The match produced by either technique is refined as the user session progresses. The result can be expected to improve, as more information is used in making the decision. The match can be refined after each user action, or after a set of user actions.

The updated current session attributes can be incorporated in optimal selection through the updated weights in FIG. 6. The updated weights can in turn depend on the merchant gain expressions provided in Table 2. The probabilities and the profit in these expressions are updated to reflect the updated session attributes. For example, if the user accepts a coupon offer earlier in the session, offering the coupon is unlikely to be as valuable. Value may reflect merchant objectives such as revenue maximization, inventory clearance etc.

This decrease in value can be reflected in the probability of coupon redemption decreasing for multiple coupons on the same product. The probability of a user accepting an offered coupon decreases if he or she has rejected a coupon on similar product earlier in the session. The probability of user clicking on an advertisement shown at a WMS increases the probability of user clicking on similar advertisements and advertisements shown at similar WMSs.

Case 3

In a third example, a given set of WMS is provided from which to select the optimal WMS to show a given ME, for a given user in a user session.

Figure 9:
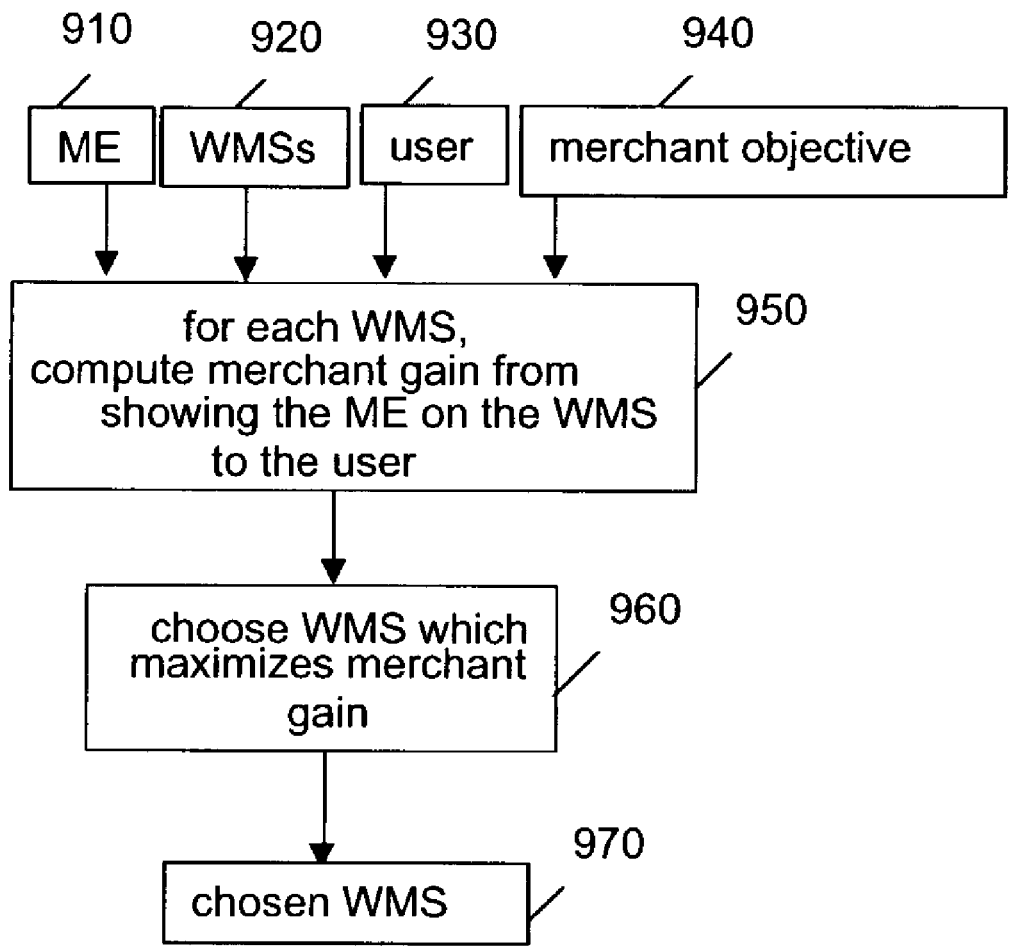
FIG. 9 is a schematic representation of optimal WMS selection, in which selection is made with reference to "merchant gain".

FIG. 9 represents an optimal selection process according to this third example. Input is provided in the form of: a ME 910, a set of WMSs 920, a user 930 and a merchant objection 940. For each WMS in the set of WMSs 920, the merchant gain from showing the ME on the WMS to the user is computed in step 950. In step 960, the WMS that maximizes the merchant gain is selected. Output is provided in the form of the selected WMS 970. The optimality is dependent on the merchant's objective, the particular user and can be with respect to the profit from product purchase or gain in market share or increase in product awareness by showing a marketing element.

Formulations for the merchant gain from showing a ME at a WMS are provided in Table 2. The various probabilities, in Table 2, can be computed from information relating to input features of the user, WMS and ME.

For example, the probability of the user accepting the coupon depends on the user's responsiveness to the coupon ME type, the match between the ME and WMS characteristics, the match between the user and ME, and the match between the user and WMS.

The WMSs in the input set can be ranked. This ranking can be based on the user's past transactions and navigational history. The ranking can also be based on a collaborative filtering approach, involving a plurality of users, on past visits to various WMSs, and response to MEs shown at various WMSs. The system uses these initial WMS ranks to make a decision. One way of using the ranks can involve multiplying the computed merchant gains by the initial ranks. The WMS with the maximum merchant gain is then selected.

Some of the WMSs in input set can be associated with a specific ME type. This association is effectively an additional constraint in the optimal matching decision. The ME type of the input ME concerned is checked, and only WMSs of that particular ME type are considered in the optimal matching process.

When a user navigates a marketing environment, the WMSs that the user is likely to visit in the current session are determined. Then, for a given ME, the optimal (in terms of merchant objective) WMS to show the ME is determined.

Case 4

In a fourth example, the techniques described with reference to FIG. 4 and FIG. 6 can be extended to optimally select the set of marketing elements to display in a set of WMSs, across a plurality of users.

Figure 10:
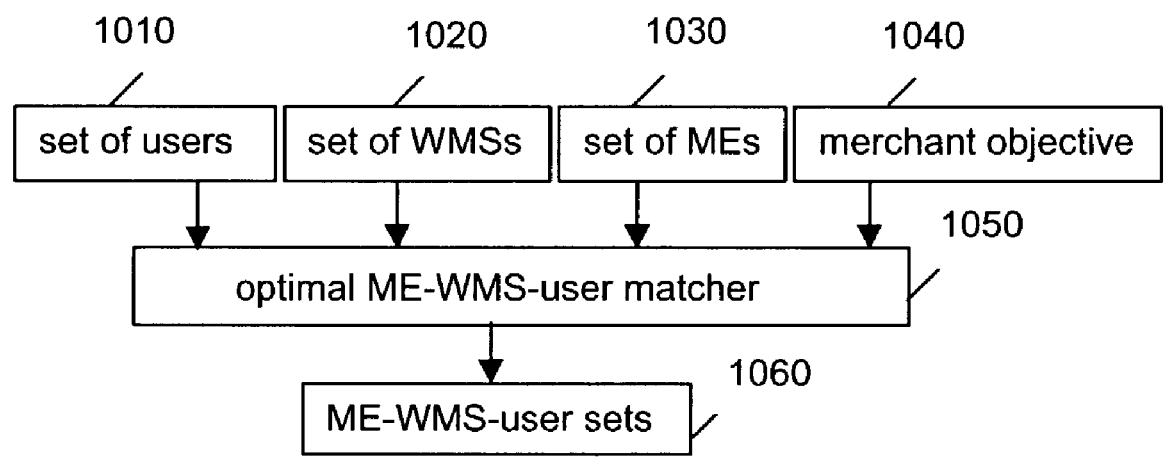
FIG. 10 is a schematic representation of inputs and outputs involved in optimally matching sets of users, WMSs and MEs.

FIG. 10 schematically represents this arrangement. In this case, optimization is performed across a plurality of users. Input is provided in the form of a set of users 1010, a set of WMSs 1020, a set of MEs 1030 and a merchant objective 1040. The optimal matcher 1050 uses this input to determined ME-WMS-user sets 1060 as output.

Optimization across users, WMSs and MEs is desirable in "budgeted" cases. For example, there may be instances in which there are constraints on the number of each ME type to be displayed, or the total amount of discount provided. Examples include: a limited number of coupons on offer, advertisements to show or products to cross-sell, a limit on the desired amount of sales of a product in a time period for the purpose of clearing the inventory, etc.

Optimization across users recognises that there may be lesser reward from one user, but greater reward from another user.

Figure 11:
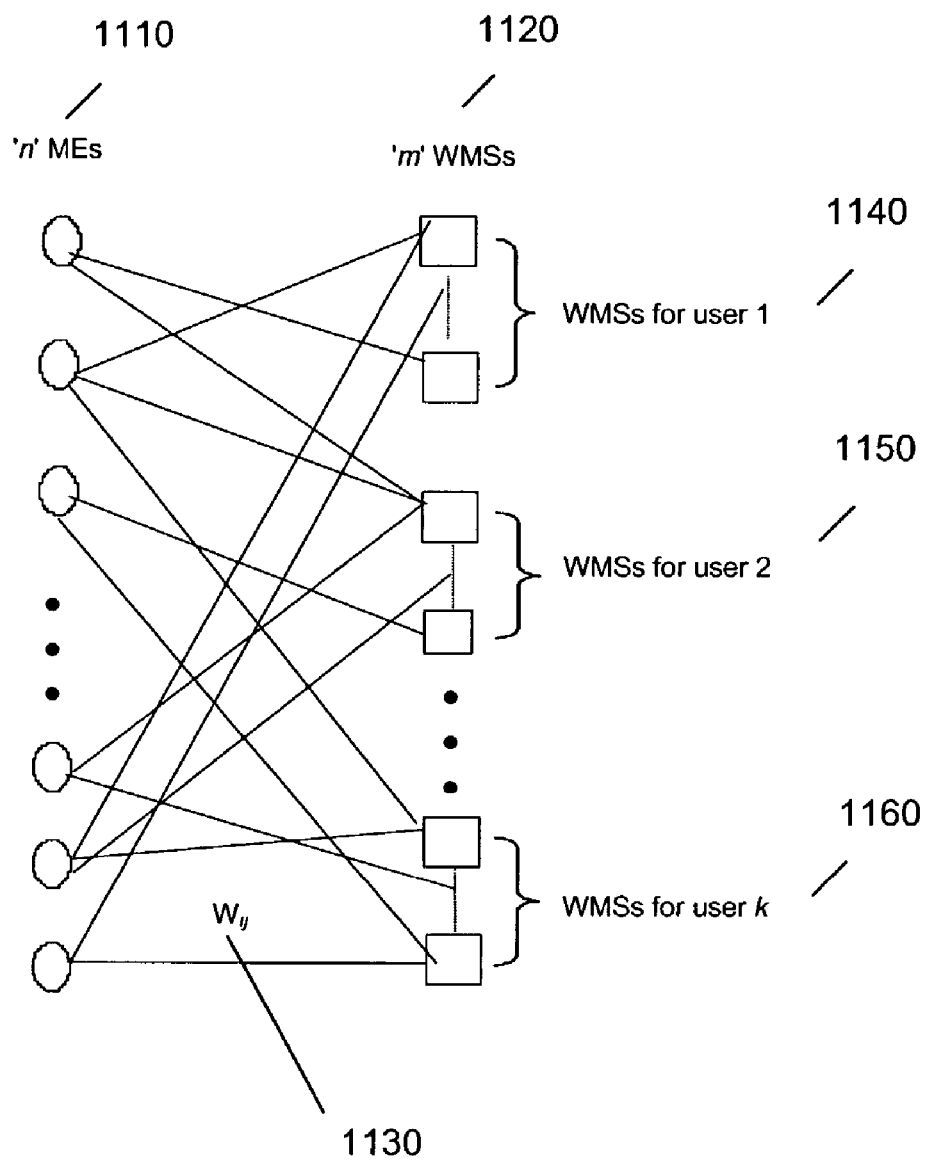
FIG. 11 is a schematic representation of optimal matching of MEs and WMSs using a bipartite graph.

FIG. 11 is a bipartite graph that shows a calculation, represented in FIG. 10, for performing such an optimization using an maximum weighted matching formulation. The MEs 1110 and WMSs 1120 constitute vertices of the graph and the edges at which the weights $W_{ij}$ 1130 connect MEs 1110 and WMSs 1120.

A WMS vertex is created for each user and each WMS at which the user can be separately shown a ME. An edge between a ME and a WMS indicates that the ME is displayed at the WMS to a user. The gain from showing a ME at a WMS can be represented by the weight $W_{ij}$ 1130 on the respective edge.

One formulation for the merchant gain represented by the weight $W_{ij}$ is provided in Table 2. The maximum weighted matching solution provides a subset of edges, such that no two edges in the solution subset share a vertex and the sum of the weights on selected edges is maximized.

The optimal ME-WMS-User matcher represented in FIG. 10 can maintain a historical profile of its decisions in various user sessions. The matcher can use this history and the users' current session attributes in making a decision. Updated current session attributes can be incorporated in optimal selection through the updated weights in FIG. 11. The updated weights can, in turn, depend on the merchant gain expressions in Table 2.

The respective probabilities and profit in the expressions of Table 2 can be updated to reflect the updated session attributes. For example, if the user has accepted a coupon earlier in the session, offering the coupon again may not be as valuable. This decrease in value can be reflected in the probability of coupon redemption decreasing for multiple coupons on the same product. The probability of user accepting an offered coupon decreases if he/she has rejected a coupon on similar product earlier in the session. The probability of user clicking on an advertisement shown at a WMS, increases the probability of user clicking on similar advertisements and advertisements shown at similar WMSs.

In FIG. 10, the merchant can specify a particular subset of users, selected from the input set of users, for which the optimal match is computed. For the remaining users, a pre-specified ME-WMS match is given as an input. Thus, the optimization is across all the users in the input set, but the decision is made only for the specified subset of users.

In FIG. 10, the input set of MEs can be user-specific. That is, there can be a different set of MEs for different users. The optimal match is then computed for a user only from his or her set of MEs, but the optimization is done across users.

Case 5

In a fifth example, optimization can be performed across a plurality of merchant objectives. The optimality of the ME-WMS match(es) are computed along each merchant objective, individually. The results are combined for various merchant objectives in a weighted manner to arrive at the final ME-WMS match(es). The merchant can provide a weight for each merchant objective or a preference among them.

Computer Hardware and Software

Figure 12:
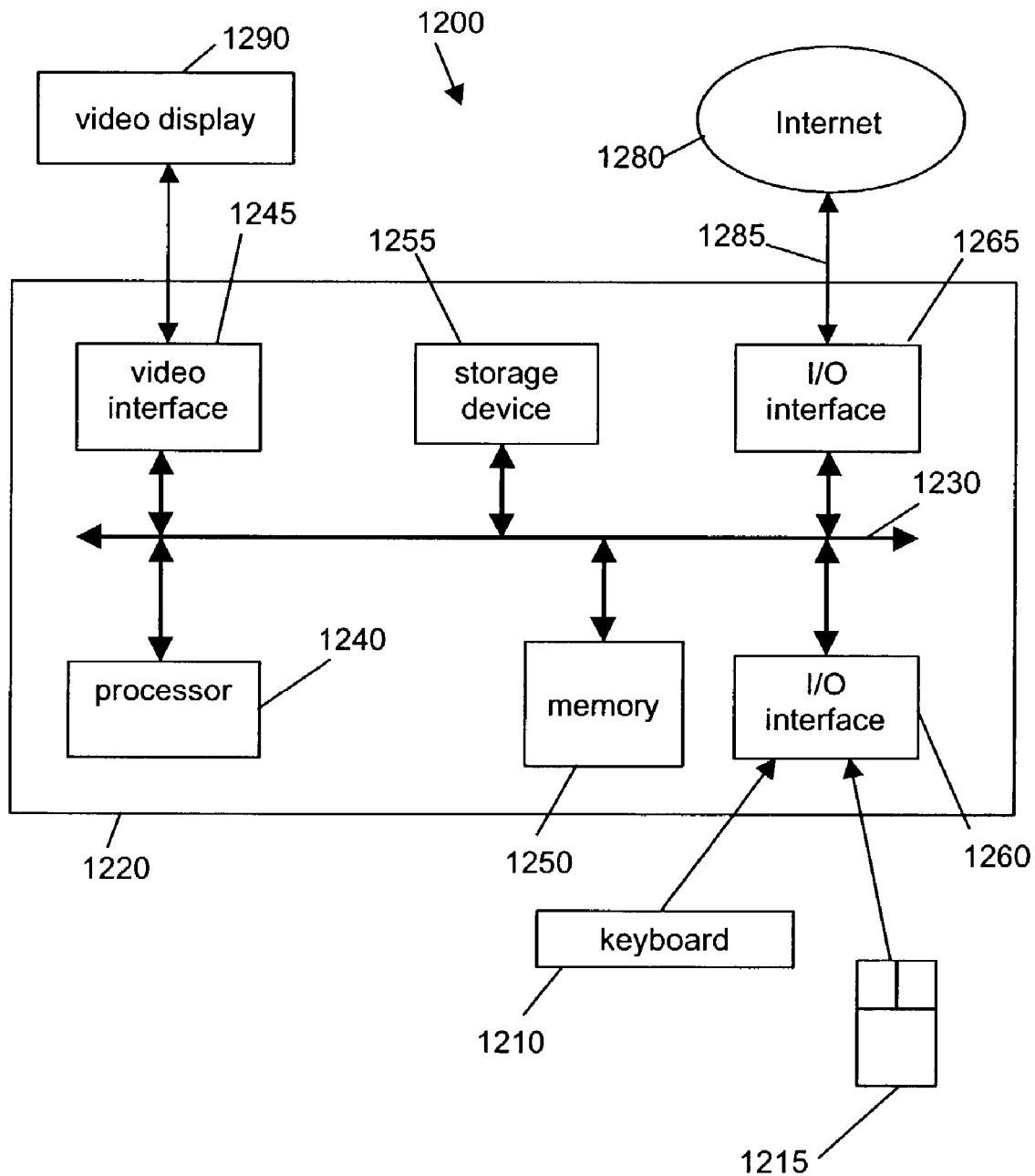
FIG. 12 is a schematic representation of a computer system suitable for use in performing techniques described herein.

FIG. 12 is a schematic representation of a computer system 1200 that can be used to perform steps in a process that implements the techniques described herein. The computer system 1200 is provided for the purpose of executing computer software that is programmed to assist in performing the described techniques. This computer software executes under a suitable operating system installed on the computer system 1200.

The computer software involves a set of programmed logic instructions that are able to be interpreted by the computer system 1200 for instructing the computer system 1200 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 1200 include: a computer 1220, input devices 1210, 1215 and video display 1290. The computer 1220 includes: processor 1240, memory module 1250, input/output (I/O) interfaces 1260, 1265, video interface 1245, and storage device 1255.

The processor 1240 is a central processing unit (CPU) that executes the operating system and the computer software executing under the operating system. The memory module 1250 include random access memory (RAM) and read-only memory (ROM), and is used under direction of the processor 1240.

The video interface 1245 is connected to video display 1290 and provides video signals for display on the video display 1290. User input to operate the computer 1220 is provided from input devices 1210, 1215 consisting of keyboard 1210 and mouse 1215. The storage device 1255 can include a disk drive or any other suitable non-volatile storage medium.

Each of the components of the computer 1220 is connected to a bus 1230 that includes data, address, and control buses, to allow these components to communicate with each other via the bus 1230.

The computer system 1200 can be connected to one or more other similar computers via a input/output (I/O) interface 1265 using a communication channel 1285 to a network 1280, represented as the Internet.

The computer software program may be provided as a computer program product, and recorded on a portable storage medium. In this case the computer software program is accessed by the computer system 1200 from the storage device 1255. Alternatively, the computer software can be accessed directly from the network 1280 by the computer 1220. In either case, a user can interact with the computer system 1200 using the keyboard 1210 and mouse 1215 to operate the programmed computer software executing on the computer 1220.

The computer system 1200 is described for illustrative purposes: other configurations or types of computer systems can be equally well used to implement the described techniques. The foregoing is only an example of a particular type of computer system suitable for implementing the described techniques.

Overview

Figure 13:
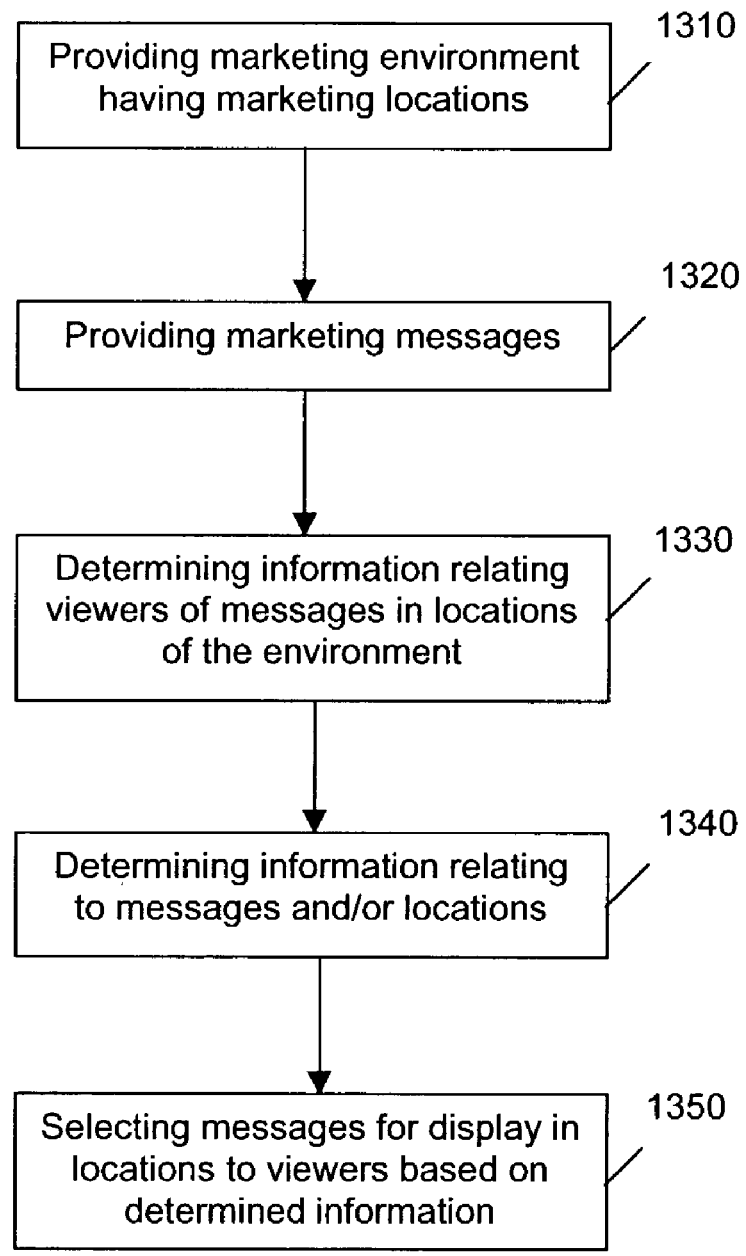
FIG. 13 is a flowchart of steps involved in matching WMS(s) and ME(s) as described herein.

FIG. 13 flowcharts, in overview, steps involved in optimal WMS-ME selection as described herein.

First, in step 1310, a marketing environment having marketing locations (WMSs) is provided. A selection of marketing messages (MEs) is also provided in step 1320.

Second, information relating to propective viewers of messages in locations of the marketing environment is determined in step 1330. Information relating to the messages and/or locations is also determined in step 1340.

Third, in step 1350 messages and selected for display in locations to viewers, based on the information determined in respect of steps 1330 and 1340.

Other Implementations and Extensions

The system can be used to select not only optimal MEs but also personalized content such as news, articles, search results, information relating to a product, information relating to a set of services, a page, section or chapter of a book, a document, a newspaper article, a movie, a TV show, a web site, and a textual material. This can be done by characterizing the content by a feature vector. The feature vector comprises of user's interest categories and information categories. This content feature vector is then used instead of the ME feature vector.

The MEs in the input set are ranked. The ranking can be based on the user's past transactions and navigational history. The ranking can also be based on a collaborative filtering, across a plurality of users, on past responses to various MEs. The system uses these initial ME ranks while making its decision. One way of using the ranks is to multiply the computed merchant gains by the initial ranks.

Some of the WMSs in input set are tied to a specific ME type. The system uses this as an additional constraint while making its decision. The system looks up the ME types of the input MEs. Only the WMS-ME matches in which the ME type of the WMS and the ME matches are considered.

The system can dynamically decide to add or delete a WMS to or from a page. This allows the system to change the user's traversal graph of WMSs and possibly get a higher gain. For example, if the user does not to respond to MEs, the system can decide to drop the WMSs from the pages he/she accesses. If the user accepts a coupon for a product X, the system can add a WMS, if one does not exist, on the next page user accesses to cross-sell a product Y. This can be easily done as the pages are usually constructed in a dynamic manner in response to user access. Besides "pop-up" screens containing the dynamic WMS can also be provided if required.

The input set of MEs and WMSs are only of a specific type. For example, the MEs are only coupons and WMSs are only coupon positions. The system determines which coupons to show in which coupon positions. The decision is made for the set of coupons as a collection. Making collective decision allows the system to incorporate coupons mutual influence into account and can yield better results.

A possible ME type can be those coupons that the user has accepted but not yet redeemed. The system can then dynamically show these accepted coupons on WMSs and remind the user to redeem them. The WMS is chosen such that it enhances the user's probability to redeem the coupon, if reminded at that instance.

The system uses learning techniques to enhance the decision's optimality. The system learns from the user's responses to its earlier decisions to update the probabilities and the profit formulations indicated in FIG. 3.

CONCLUSION

The techniques described herein relate specifically to dynamic, personalized product marketing, but can be easily extended to dynamic, personalized content marketing. Various alterations and modifications can be made to the techniques and arrangements described herein, as would be apparent to one skilled in the relevant art.

We claim:

1. A computer-implemented method of advantageously using web marketing space by determining a marketing element that is shown in web marketing spots to a user, said method comprising:

inputting, to a computer, user information, said user information comprising current session attributes,
wherein said current session attributes comprise any of shopping cart contents, web marketing spots visited in a current session, products viewed in said current session, and responses to marketing elements shown in said current session;

inputting, to said computer, web marketing spot information, said web marketing spot information comprising locations of each of a plurality of web marketing spots on a containing page of said web marketing space;

inputting, to said computer, marketing element information, said marketing element information comprising marketing elements including any of an advertisement, a discount, a cross-sell recommendation, an up-sell recommendation, and a coupon,
wherein each one of said plurality of web marketing spots contains one marketing element;

inputting, to said computer, a merchant's marketing objective information, said merchant's marketing objective information comprising a merchant's marketing objective including one of profit from a purchase, gain in market share, an increase in product awareness, and time taken to compute a solution;

computing, by said computer, for each possible location of each of said marketing elements in said plurality of web marketing spots, a merchant gain, according to said merchant's marketing objective, from showing said each possible location of each of said marketing elements to said user in said current user session, said computing being based on probabilities derived from said current session attributes of said user and said merchant's marketing objective; and outputting, by said computer, an advantageous marketing element for each of said plurality of web marketing spots in said current user session, which maximizes said merchant gain, based on said probabilities derived from said current session attributes of said user and said merchant's marketing objective.

2. The method as claimed in claim 1,
wherein said user information further comprises past transaction attributes and demographic attributes, and wherein said past transaction attributes comprise any of products or product categories purchased, response to advertisements, cross-sales and up-sales, coupon acceptance and redemption record, response to discounts, navigation paths, and other web marketing spots visited.

3. The method as claimed in claim 1,
wherein said web marketing spot information further comprises any of content of said containing page, type of containing page, and probability of said user visiting said containing page,
wherein said content comprises any of terms of products or product categories, and
wherein said type comprises any of a catalog page, a login page, a shopping cart page, and an order process page.

4. The method as claimed in claim 1, wherein said marketing elements are characterized as one of advertised, recommended, or discounted products or product categories.

5. The method as claimed in claim 1, wherein said coupon is characterized by a validity period, a discount type and amount, and redemption terms.

6. The method as claimed in claim 1, wherein said marketing elements further comprise a subset of marketing elements to display in a set of web marketing spots for said user in said current user session, and said computing and said outputting relates to said subset of marketing elements.

7. A computer system that advantageously uses web marketing space by determining a marketing element that is shown in web marketing spots to a user, the system comprising:
a memory that stores:
user information, said user information comprising current session attributes,
wherein said current user attributes comprise any of shopping contents, web marketing spots visited in a current session, products viewed in said current session, and responses to marketing elements shown in said current session;
web marketing spot information, said web marketing spot information locations of each of a plurality of web marketing spots on a containing page of said marketing space;
marketing element information, said marketing element information comprising marketing elements including any of an advertisement, a discount, a cross-sell recommendation, an up-sell recommendation, and a coupon,
wherein each one of said plurality of web marketing spots contains one marketing element; and
a merchant's marketing objective information, said merchant's marketing objective information comprising a merchant's marketing objective including one of profit from a purchase, gain in market share, an increase in product awareness, and time taken to compute a solution; and
a processor configured to:
compute, for each possible location of each of said marketing elements in said plurality of web marketing spots, a merchant gain, according to said merchant's marketing objective, from showing said each possible location of each of said marketing elements to said user in said current user session, said computing being based on probabilities derived from said current session attributes of said user and said merchant's marketing objective; and
output an advantageous marketing element for each of said plurality of web marketing spots in said current user session, which maximizes said merchant gain, based on said probabilities derived from said current session attributes of said user and said merchant's marketing objective.

8. The system as claimed in claim 7,
wherein said user information further comprises past transaction attributes and demographic attributes, and
wherein said past transaction attributes comprise any of products or product categories purchased, response to advertisements, cross-sales and up-sales, coupon acceptance and redemption record, response to discounts, navigation paths, and other web marketing spots visited.

9. The system as claimed in claim 7,
wherein said web marketing spot information further comprises any of content of said containing page, type of containing page, and probability of said user visiting said containing page,
wherein said content comprises any of terms of products or product categories, and
wherein said type comprises any of a catalog page, a login page, a shopping cart page, and an order process page.

10. The system as claimed in claim 7, wherein said marketing elements are characterized as one of advertised, recommended, or discounted products or product categories.

11. The system as claimed in claim 7, wherein said coupon is characterized by a validity period, a discount type and amount, and redemption terms.

12. The system as claimed in claim 7, wherein said marketing elements further comprise a subset of marketing elements to display in a set of web marketing spots for said user in said current user session, and said computing and said outputting relates to said subset of marketing elements.

13. A computer program storage medium readable by a computer, tangibly embodying a program of instructions executable by said computer to perform a method of advantageously using web marketing space by determining a marketing element that is shown in web marketing spots to a user, said method comprising:
inputting user information, said user information comprising current session attributes,
wherein said current session attributes comprise any of shopping cart contents, web marketing spots visited in a current session, products viewed in said current session, and responses to marketing elements shown in said current session;
inputting web marketing spot information, said web marketing spot information comprising locations of each of a plurality of web marketing spots on a containing page of said web marketing space;
inputting marketing element information, said marketing element information comprising marketing elements including any of an advertisement, a discount, a cross-sell recommendation, an up-sell recommendation, and a coupon,
wherein each one of said plurality of web marketing spots contains one marketing element;
inputting a merchant's marketing objective information, said merchant's marketing objective information comprising a merchant's marketing objective including one of profit from a purchase, gain in market share, an increase in product awareness, and time taken to compute a solution;
computing, for each possible location of each of said marketing elements in said plurality of web marketing spots, a merchant gain, according to said merchant's marketing objective, from showing said each possible location of each of said marketing elements to said user in said current user session, said computing being based on probabilities derived from said current session attributes of said user and said merchant's marketing objective; and outputting an advantageous marketing element for each of said plurality of web marketing spots in said current user session, which maximizes said merchant gain, based on said probabilities derived from said current session attributes of said user and said merchant's marketing objective.

14. The computer program storage medium as claimed in claim 13, wherein said user information further comprises past transaction attributes and demographic attributes, and wherein said past transaction attributes comprise any of products or product categories purchased, response to advertisements, cross-sales and up-sales, coupon acceptance and redemption record, response to discounts, navigation paths, and other web marketing spots visited.

15. The computer program storage medium as claimed in claim 13, wherein said web marketing spot information further comprises any of content of said containing page, type of containing page, and probability of said user visiting said containing page, wherein said content comprises any of terms of products or product categories, and wherein said type comprises any of a catalog page, a login page, a shopping cart page, and an order process page.

16. The computer program storage medium as claimed in claim 13, wherein said coupon is characterized by a validity period, a discount type and amount, and redemption terms.

17. The computer program storage medium as claimed in claim 13, wherein said marketing elements further comprise a subset of marketing elements to display in a set of web marketing spots for said user in said current user session, and said computing and said outputting relates to said subset of marketing elements.

* * * * *

UNITED STATES PATENT AND TRADEMARK OFFICE
CERTIFICATE OF CORRECTION

PATENT NO. : 7,617,122 B2 Page 1 of 1
APPLICATION NO. : 10/230910
DATED : November 10, 2009
INVENTOR(S) : Kumar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1839 days.

Signed and Sealed this

Nineteenth Day of October, 2010

David J. Kappos
*Director of the United States Patent and Trademark Office*